Feb. 22, 1966    A. R. FOREMAN    3,236,431
AUTOMATIC SELF-CENTERING ROLL
Filed Dec. 6, 1962    2 Sheets-Sheet 1

INVENTOR.
ARCHIE R. FOREMAN
BY
TILBERRY AND BODY
ATTORNEYS

INVENTOR.
ARCHIE R. FOREMAN
BY Tillberry & Body
TILBERRY AND BODY
ATTORNEYS

United States Patent Office 3,236,431
Patented Feb. 22, 1966

3,236,431
AUTOMATIC SELF-CENTERING ROLL
Archie R. Foreman, Mentor, Ohio, assignor to Production Machinery Corporation, Mentor, Ohio, a corporation of Ohio
Filed Dec. 6, 1962, Ser. No. 242,832
6 Claims. (Cl. 226—190)

The present invention relates to the art of strip guide rolls and more particularly to a guide roll that automatically centers and aligns a strip passing thereover.

The present invention is particularly applicable to the art of maintaining a metal strip centered with respect to a rotatable guide roll and it will be discussed with particular reference thereto; however, it is to be appreciated that the invention has much broader applications and may be used to maintain various moving strips centered with respect to a pulley or a guide roll.

In the processing of metal strip, the strip is conveyed over rolls in the uncoiled condition. When the strip is conveyed over a roll in the processing equipment it is likely that the strip will be fed at a slight angle to the roll. Because of this, the strip will work its way across the face of the roll. In addition, the camber and/or lateral curvature which is present in the finished strip due to rolling inconsistencies causes the strip to approach the roll at an angle, and this also causes the strip to move across the face of the roll. In order to keep the strip in the desired path of travel over the roll, various expedients have been used. One of the most common is the use of stationary or rotatable side guides against which the edges of the strip bear. In some instances side guides have been used in conjunction with free hanging loops of the strip to maintain the strip on the desired center line. The use of abnormally high strip tension without side guides has been tried in an attempt to keep the strip aligned onto the roll. Another method of operation is to periodically slip or slue the strip back into its approximate proper position on the conveying roll.

All of the above methods of centering strip tend to abrade and mutilate the strip edges and in some instances cause the edges of the strip to be stretched beyond the elastic limits of the metal. Diagonal or lateral surface scratches are also formed on finely finished flat products of all kinds, these scratches being detrimental to subsequent operations and, together with edge damage, result in the scrapping of a large percentage of material being processed.

The problems discussed above also exist in belt conveyors and drive belts used in conjunction with belt pulleys. If the belt is made of rubber or other relatively soft material, it is more easily damaged. In addition to the methods of aligning strip mentioned above, crowned rolls have been used to center material having a low modulus of elasticity such as textile, rubber and composition belts.

These and other disadvantages are completely overcome by the present invention which is directed toward a guide roll or belt pulley having a particular surface construction which automatically centers a strip or belt passing thereover without damage to either the strip or the belt.

In accordance with the present invention there is provided a roll for automatically centering a moving object, strip or belt, as it passes thereover, the roll comprising a central cylindrical portion and end cylindrical portions wherein the periphery of the central portion is constructed of a material capable of and arranged to circumferentially elongate under a given radial force to a greater extent than the material forming the end portions.

More specifically, in accordance with the present invention there is provided a roll for automatically centering a moving object, strip or belt, as it passes thereover, the roll comprising axially spaced cylindrical end portions formed from a rubber-like material capable of being deformed to a lesser extent than the material between these spaced end portions when subjected to a given radial force.

In accordance with another aspect of the present invention there is provided a method of maintaining the longitudinal axis of a moving strip in a constant vertical plane which method comprises pulling the strip over a roll having axially spaced end portions formed from a rubber-like material capable of being deformed to a lesser extent than the material between these spaced end portions when subjected to a given radial force and applying sufficient tension to the strip to deform the rubber-like material in contact therewith.

The primary object of the present invention is the provision of an apparatus for automatically centering moving elongated objects, strips or belts, without damage thereto.

A further object of the present invention is the provision of an apparatus of the type mentioned above which does not depend upon contact with the edge of the elongated objects or abnormal tensioning of the elongated objects to keep the object in centered alignment.

Still a further object of the present invention is the provision of a method of keeping the longitudinal axis of a moving strip in a constant vertical plane.

A further object of the present invention is the provision of an apparatus for automatically centering a moving, elongated object which apparatus comprises a cylindrical body having axial end portions separated by a central portion wherein the end portions are formed of material which elongates in a circumferential direction or deforms under radial force to a lesser extent than the material forming the central portion.

A further object of the present invention is the provision of an apparatus for automatically centering a moving, elongated object which apparatus comprises a roll which presents a continuous, uninterrupted, outer cylindrical surface.

Still a further object of the present invention is the provision of an apparatus for automatically centering a moving, elongated object which apparatus is inexpensive to manufacture and durable in operation.

These and other objects and advantages will become apparent from the following description used to illustrate the preferred embodiment of the invention as read in connection with the accompanying drawings in which.

Figure 1:
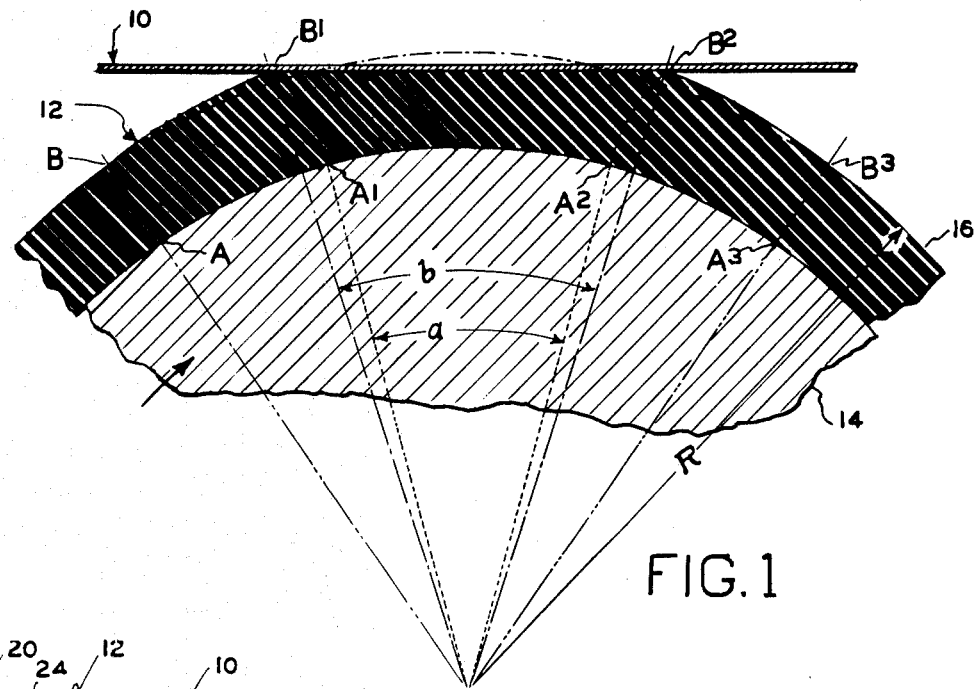
FIGURE 1 is a partial, somewhat schematic view showing, in exaggerated form, the operating characteristics of a guide roll utilized in the present invention.

Referring now to the drawings, wherein the showings are for the purpose of illustrating preferred embodiments of the invention only and not for the purpose of limiting same, FIGURE 1 shows a moving, elongated object, hereinafter referred to as stripe 10, passing over the outer cylindrical surface of a rotating support roll 12 comprising, essentially, a rigid core, or spool 14, constructed of steel or other similar material and a cylindrically-shaped, resilient covering 16 secured onto spool 14 and formed from any of a variety of known rubber-like or resilient materials.

In order to appreciate the present invention, FIGURE 1 illustrates the operating principle which is applied to the construction of a roll 12 to automatically center the strip 10 thereon. The material contemplated for use in covering 16 can be defined as "rubber-like" or "resilient" which means that it is relatively non-compressible, but, elastically deformable to a great extent when subjected to an external force. As the material is deformed by such an external force the static outer dimensions are readily changed; however, the volume does not substantially change and the static dimensions are reassumed when the applied force is removed. This characteristic of rubber-like material as used herein causes a phenomenon in a roll having such a covering, which phenomenon is utilized in accordance with the present invention to impart an automatic self-centering feature to the strip guide roll 12.

As the strip 10, under tension, passes over roll 12, a radial force is exerted on covering 16 so that the resilient covering in contact with the strip is forced inwardly. It would seen that this inward movement would cause strip 10 to move slower than the theoretical peripheral velocity of the roll because the radius of the roll 12 in contact with the strip has been reduced from the static radius R which is the radius of the roll when the strip is not being forced against the covering 16. It has been found that the contrary is true, the speed of the strip is greater than the theoretical peripheral velocity of the roll because of the circumferential elongation of the covering 16 under the radial force applied by strip 10.

Covering 16 is bonded onto spool 14 so that points A, $A_1$, $A_2$ and $A_3$ at the bonded joint remain in the same position irrespective of the radial deformation of covering 16. Points B, $B_1$, $B_2$ and $B_3$ are on the external surface of covering 16 and are radially aligned with like A points when covering 16 is not deformed. Points B and $B_3$ are the points at which there is no appreciable deformation of covering 16 because of the force exerted by strip 10. The covering between points $B_1$ and $B_2$ is in contact with strip 10 and is deformed inwardly. It is obvious from the drawings, that the distance between points $B_1$ and $B_2$ when strip 10 is supported by the covering between these points is greater than the distance between points $B_1$ and $B_2$ when they are in their static positions. The circumferential distance between points $B_1$ and $B_2$ in the static condition is essentially determined by angle $a$ whereas the distance between these points, when they are in the position shown in FIGURE 1, is determined by angle $b$ which is greater than angle $a$. Thus, point $B_1$ with catch point $A_1$ and pass the same while roll 12 is moving through angle $a$. Consequently, the linear speed of the roll surface between points $B_1$ and $B_2$ is greater than the linear speed of other points on the surface of covering 16 because covering 16 is circumferentially elongated by the radial force applied by strip 10. Accordingly, the linear speed of strip 10, which is governed by the linear speed of the covering 16 in contact therewith, is increased because of the circumferential elongation of the covering 16. The amount of elongation, and, thus, the increase in speed is determined by the ability of the covering 16 to deform under a radial force.

The rubber-like material from which covering 16 is formed has the characteristic of being capable of circumferential elongation as defined above when a radial force is exerted against the covering. Rubber has been found to have such a property; however, it is appreciated that other materials may have the same property and it is within the contemplation of the present invention to include such materials within the scope of the invention.

Figure 2:
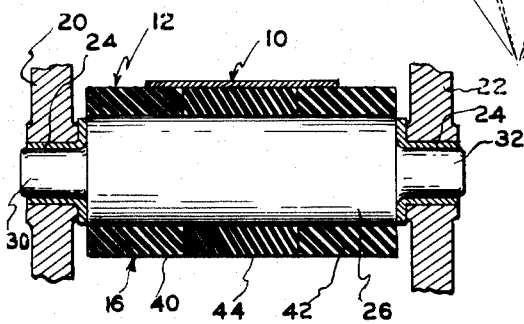
FIGURE 2 is a cross-sectional view illustrating somewhat schematically one preferred embodiment of the present invention.

Referring now to FIGURE 2, there is illustrated a preferred embodiment of the present invention wherein strip 10 is adapted to travel over the outer circumferential surface of roll 12 having an outer resilient covering 16. A variety of constructions can be utilized to rotatably mount the roll 12; however, in accordance with the embodiment disclosed in FIGURE 2, there are provided spaced stands 20, 22 having aligned openings adapted to receive bearing bushings 24. Shaft 26 adapted to support the covering 16 is provided with terminal reduced ends 30, 32 which extend into bushings 24. In accordance with this embodiment of the present invention, resilient covering 16 comprises axial end portions 40, 42 separated by a central portion 44 which central portion may have any desired width; however, in accordance with the preferred embodiment, the width of central portion 44 is not greater than the width of strip 10.

In accordance with the embodiment of the invention disclosed in FIGURE 2, the thickness of covering 16 is substantially uniform throughout the axial length of the roll; however, the material forming end portions 40, 42 is characterized by being elongated in a circumferential direction to a lesser extent than the material forming the central portion 44 when subjected to a given radial force. Stated differently, the material forming end portions is capable of being deformed to a lesser extent than the material forming the central portion 44. To accomplish this, portions 40, 42 may be formed from a harder rubber than central portion 44. The differential in circumferential elongation caused by the differential in deformation between the end portions and the central portion will somewhat affect the centering sensitivity of the roll; however, the relative elongation can be varied to a great extent without completely defeating the self-centering feature of the roll.

In operation of the embodiment disclosed in FIGURE 2, strip 10 passes over rotating roll 12 and exerts a radial force on covering 16 according to the tension on the strip. This radial force circumferentially elongates the portions of surface 16 in contact with the strip as was described in detail in FIGURE 1. The amount of circumferential elongation, i.e. the elongation between points $B_1$ and $B_2$, determines the increase in linear speed of that portion of the strip in contact with the elongated covering. For a given force, the harder resilient material forming end portions 40, 42 will deform or elongate to a lesser extent than the material forming the central portion 44; therefore, the distance between points $B_1$ and $B_2$ will be less for the end portions than for the central portion. Accordingly, for a given force, the linear speed of strip 10 in contact with end portions 40, 42 will tend to be less than the linear speed of the strip in contact with the central portion 44. While the strip is centered, the tendency of portions 40, 42 to decrease the linear speed of strip 10 will be balanced; however, as the strip moves toward one end portion, for instance portion 42, a greater area of the strip will engage and deform end portion 42 and a lesser area will engage and deform end portion 40. The end portion 42 will predominate over portion 40 and the side of the strip in contact with portion 42 will tend to move at a slower rate than the side of the strip in contact with the central portion 44. Because of the tendency to decrease the linear speed of only one side of strip 10, strip 10 tends to be forced back toward end portion 40. This centers the strip on the roll.

Figure 3:
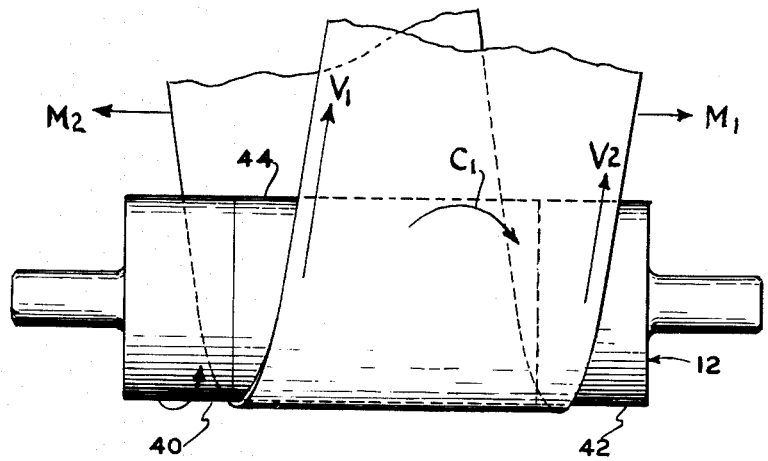
FIGURE 3 is a somewhat schematic side elevational view of the roll and strip.

FIGURE 3 illustrates the operating characteristics of roll 12 with the strip 10 shown wrapped around the roll whereas the strip in FIGURE 1 is shown traveling over the roll as in the case of a pinch roll set. When strip 10 has moved to the right on roll 12, whether wrapped as in FIGURE 3 or horizontal as in FIGURE 1, the velocity differential action of end portion 42 predominates over the same action of end portion 40. Accordingly, since the circumferential elongation of center portion 44 is greater than the circumferential elongation of end portion 42, the tendency of strip 10 is to have a larger velocity, represented as vector $V_1$, at a position spaced from portion 42 and a smaller velocity, represented as $V_2$, at a position adjacent end portion 42. The difference in velocity between velocities $V_1$ and $V_2$ creates a turning moment $C_1$ in strip 10 which moment tends to shift strip 10 in direction $M_1$ as it leaves roll 12. This same turning moment $C_1$ has a reverse action on the strip 10 approaching the roll 12 and it tends to force the incoming strip in the direction $M_2$. Consequently, strip 10 is forced toward end portion 40 as it approaches the roll 12. The same action, except in the reverse, takes place when the strip 10 tends to migrate or walk toward end portion 40.

It is to be realized that the particular end portion of covering 16 having the greater tendency to decrease the speed of the strip will determine the centering action on the roll 12. Basically, the area of the strip in contact with the deformable end portions determines the amount of force tending to decrease the speed of the strip and, thus, the direction of the centering action.

Roll 12 as shown in FIGURE 2 has axial end portions formed from a material which tends to elongate in a circumferential direction to a lesser extent than the material forming the central portion. The differential in elongation is caused by the relative softness of the rubber. A differential in elongation can be accomplished by utilizing the same material for the whole covering 16 and providing means for supporting the material so that the material adjacent the axial end portions of the roll will tend to elongate or deform to a lesser extent than the material at the central portion under a given radial force.

Figure 4:
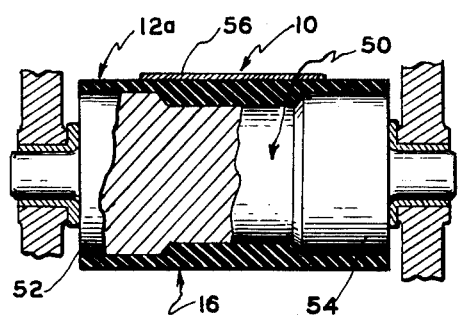
FIGURE 4 is a cross-sectional view illustrating somewhat schematically a further preferred embodiment of the present invention.

An embodiment of the invention incorporating this concept is shown in FIGURE 4 wherein roll 12a comprises a backing spool 50 with end portions 52, 54 and a central recessed portion 56. Covering 16 is formed from a uniformly resilient material so that the outer surface of the roll 12a is concentric with the spool and has a uniform diameter over the complete axial length of the roll. The differential in circumferential elongation between the end portions and the central portion of covering 16 is accomplished by the relative thickness of the covering at these portions. For instance, the thickness of the covering at portions 52, 54 is substantially less than the thickness of the covering at central portion or recessed portion 56. Consequently, a given radial force will cause a lesser circumferential elongation adjacent portions 52, 54 than it will cause adjacent the recessed or central portion 56. The operation of roll 12a as shown in FIGURE 4 is substantially identical to the operation of the roll 12 as shown in FIGURE 2. In this particular embodiment of the invention, i.e. roll 12a, the relative elongation of the circumference, which determines the relative speed of certain portions of the strip, is obtained by changing the thickness of the covering 16 so that the end portions will elongate to a lesser extent than the central portion. It is realized that the difference in thickness must be controlled to obtain the proper centering action.

The operation of roll 12a in FIGURE 4 was based on the assumption that the strip 10 could sag somewhat into the covering 16 adjacent recessed portion 56 so that the elongation of the covering at this position would be greater than the elongation of the covering adjacent portions 52, 54. In a like manner, the operation of roll 12 in FIGURE 2 is based on the assumption that the strip 10 could sag somewhat into the central portion 44. It is conceivable, that certain metal strip would not sag into recessed portion 56. This is especially possible when the strip has a substantial thickness and is wrapped around roll 12a. If the strip 10 does not sag into recess 56 a radial force exerted on the strip will deform the covering inwardly the same distance no matter how thick or easily deformable certain portions of the covering may be. Accordingly, the greatest circumferential elongation will take place opposite the thinner portions of covering 16, which is opposite the results obtained when the strip can easily sag into the recessed portion 56. Thus, the elongation of the end portions is greater than the elongation of the central portion. This is completely reversed from the operating characteristics of rolls 12 and 12a when the strip 10 is pliable enough to deflect into the recessed portion 56.

Figure 5:
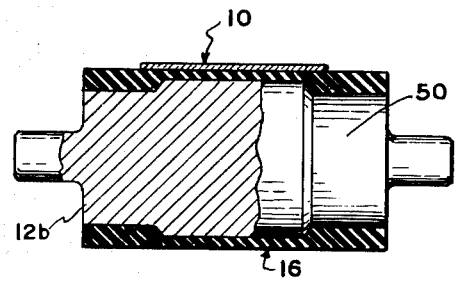
FIGURE 5 is a cross-sectional view illustrating somewhat schematically an embodiment of the invention used to control a more rigid strip.

The present invention is directed toward the concept of providing differential speed on the strip 10 by controlling the amount of circumferential elongation of the covering 16 in engagement with various portions of strip 10 and the orientation of these speed differentials to maintain the strip centered on the roll. Consequently, in the situation where strip 10 will not appreciably deflect into the recess, the central portion of the roll is made more shallow and the end portions have a greater radial thickness. This is the opposite of the tracking roll 12a shown in FIGURE 4; however, such a construction is within the contemplation of the invention. The general configuration is shown in FIGURE 5 wherein roll 12b has a backing spool 50 with the central portion having a diameter greater than the end portions. In this embodiment of the invention, the strip 10 is assumed to be stiff so that it does not sag, as this term is used in this application. Consequently, the inward movement of the strip is the same across the face of the roll 12b, as explained above. The central portion of the covering 16 will be circumferentially elongated more than the end portions and the roll 12b will center the strip in the same manner as rolls 12, 12a.

In summary, the speed of a portion of strip 10 is determined by the linear speed of the covering 16 in contact with the strip and, by providing a resilient covering 16, the speed of the strip can be increased because radial forces against the covering elongate the covering 16 and thus increase the speed of the strip in contact therewith. In the preferred embodiment of the invention, end portions on rolls 12 and 12a elongate in a circumferential direction to a lesser extent than the central portion of the roll with a given radial force and the strip will tend to remain in the center of the rolls. It is to be appreciated that rolls 12 and 12a can be either idler rolls, driven rolls or brake rolls as the occasion may demand. Further, this principle and roll construction may be used in bridles and pinch rolls.

The present invention has been discussed in connection with certain structural embodiments; however, it is to be appreciated that the various modifications may be made without departing from the intended spirit and scope of the invention as defined in the appended claims.

Having thus described by invention, I claim:

1. In the combination of a moving strip having a substantially uniform thickness across its width and a cylindrical roll having a rubber-like covering for supporting said strip as said strip moves circumferentially along said roll, said covering having a uniform outer diameter in an axial direction, the improvement comprising: said cylindrical roll having a central portion and axially spaced end portions of substantial width and adapted to receive a portion of said strip, said covering being over said portions and being arranged to circumferentially elongate when subjected to a radial force by said strip, and means for allowing greater circumferential elongation at said central portion than at said end portions as said strip passes circumferentially over said roll whereby said roll automatically centers and aligns said moving strip.

2. The improvement as defined in claim 1 wherein said covering over said central portion is formed from a rubber-like material having a resiliency greater than the material over said end portions.

3. The improvement as defined in claim 2 wherein said material over said end portions and said material over said central portion has substantially the same radial thickness.

4. The improvement as defined in claim 1 wherein the covering over said end portions has a radial thickness less than the radial thickness of said central portion.

5. The improvement as defined in claim 1 wherein said roll includes a central spool for supporting said covering, said spool having a recessed central portion opposite the central portion of said covering.

6. In the combination of a relatively stiff, moving strip having a substantially uniform thickness across its width and a cylindrical roll having a rubber-like covering for supporting said strip as said strip moves circumferentially along said roll, said covering having a uniform outer diameter in an axial direction, the improvement comprising: said cylindrical roll including a central portion and axially spaced end portions of substantial width and adapted to receive a portion of said strip, said portions being covered by said covering, said covering at said end portions having a radial thickness greater than said covering at said central portion, whereby said roll automatically centers and aligns said moving strip.

References Cited by the Examiner
UNITED STATES PATENTS

| | | | |
|---|---|---|---|
| 824,848 | 7/1906 | Corwin | 29—125 |
| 1,466,094 | 8/1923 | Furbush | 29—125 |
| 1,542,221 | 6/1925 | De Jarnette | 29—125 |
| 1,837,925 | 12/1931 | Thompson | 29—125 X |
| 2,592,581 | 4/1952 | Lorig | 226—3 |

FOREIGN PATENTS 724,763   2/1955   Great Britain.

ROBERT B. REEVES, *Primary Examiner.*
JOSEPH D. BEIN, *Examiner.*